(12) United States Patent
Hirota et al.

(10) Patent No.: US 9,841,635 B2
(45) Date of Patent: Dec. 12, 2017

(54) LIQUID CRYSTAL DISPLAY DEVICE

(71) Applicant: Japan Display Inc., Tokyo (JP)

(72) Inventors: Takenori Hirota, Tokyo (JP); Yasuhiro Kanaya, Tokyo (JP); Hidehiro Sonoda, Tokyo (JP); Toshiki Kaneko, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/613,561

(22) Filed: Jun. 5, 2017

(65) Prior Publication Data

US 2017/0269405 A1   Sep. 21, 2017

Related U.S. Application Data

(63) Continuation of application No. 14/720,381, filed on May 22, 2015, now Pat. No. 9,709,854.

(30) Foreign Application Priority Data

May 28, 2014 (JP) ................................. 2014-110118

(51) Int. Cl.
*G02F 1/1339* (2006.01)
*G02F 1/1333* (2006.01)

(52) U.S. Cl.
CPC ...... *G02F 1/1339* (2013.01); *G02F 1/133345* (2013.01); *G02F 2001/133388* (2013.01)

(58) Field of Classification Search
CPC ................... G02F 1/1339; G02F 2001/13415
See application file for complete search history.

(56) References Cited

U.S. PATENT DOCUMENTS

| 6,057,038 A | 5/2000 | Terashita et al. |
| 6,608,660 B1 | 8/2003 | Okamoto et al. |
| 2013/0003006 A1* | 1/2013 | Wang .................... G02F 1/1339 349/138 |
| 2015/0301370 A1 | 10/2015 | Moriwaki |

FOREIGN PATENT DOCUMENTS

| JP | H10-206871 A | 8/1998 |
| JP | 2012-189856 A | 10/2012 |

* cited by examiner

*Primary Examiner* — Timothy L Rude
(74) *Attorney, Agent, or Firm* — Typha IP LLC

(57) ABSTRACT

A reliability of seal portion of a liquid crystal display device can be improved by the following structure. A liquid crystal display device includes: a TFT substrate which includes a display region and a terminal part, and has an inorganic insulating film formed on an organic passivation film and an alignment film formed over the inorganic insulating film; a counter substrate, the TFT substrate and the counter substrate bonded together by a sealing material formed at a seal part surrounding the display region; and a liquid crystal sealed inside. At the seal part, a transparent conductive oxide film is formed between the inorganic insulating film and the alignment film. The transparent conductive oxide film exists inside an edge of the TFT substrate and hence, the edge of the TFT substrate is free of the transparent conductive oxide film.

9 Claims, 21 Drawing Sheets

LIQUID CRYSTAL DISPLAY DEVICE

CROSS-REFERENCE TO RELATED APPLICATIONS

This application is a continuation of U.S. patent application Ser. No. 14/720,381 filed on May 22, 2015. Further, this application claims priority from Japanese Patent Application Number 2014-110118 filed on May 28, 2014, the contents of which are hereby incorporated by reference into this application.

BACKGROUND

The present invention relates to a liquid crystal display device and more particularly, to a liquid crystal display device of a narrower frame width that can ensure reliability of a seal part.

A liquid crystal display device includes: a TET substrate where pixels each including a pixel electrode, a thin film transistor (TFT) and the like are arranged in a matrix; a counter substrate opposed to the TFT substrate; and liquid crystal sandwiched between the TFT substrate and the counter substrate. The liquid crystal display device forms an image by controlling transmittance of light through liquid crystal molecules on a per-pixel basis.

Being flat and light in weight, the liquid crystal display device has been finding wider applications in various fields. Compact liquid crystal display devices have been widely used in cellular phones, DSCs (Digital Still Cameras) and the like. Medium- and small-sized liquid crystal display devices are faced with a strong demand for enlarging a display region while maintaining a small outside configuration. Accordingly, the liquid crystal display device is reduced in width between an edge of the display region and an edge of the device. Namely, the device is adapted to a so-called narrow frame design. The device having the narrower frame is reduced in seal width of a sealing material bonding the TFT substrate and the counter substrate together and hence, is faced with a problem of a bonding force of the seal part.

An alignment film for initial alignment of the liquid crystal molecules is formed on each of the surfaces of the TFT substrate and the counter substrate, on which surfaces the TFT substrate and the counter substrate make contact with the liquid crystal. The prior-art technique has adopted a structure where the alignment film is not formed on the seal part in order to increase the reliability in the bonding of the seal part. In the case of the narrow frame design, however, it is difficult to exclude the alignment film from the seal part. To address the reliability in the bond of the seal part, therefore, consideration must be given to the bond strength between the sealing material and the alignment film and the bond strength between the alignment film and an underlying film thereof.

As a technique for preventing the rubbing off of the alignment film on projections resulting from wiring on the display region, Japanese Unexamined Patent Application Publication No. 2012-189856 suggests an approach to increase the bond strength of the alignment film by applying ITO (Indium Tin Oxide) on the projections. Further, Japanese Unexamined Patent Application Publication No. Hei 10-206871 discloses a structure where the wiring is formed of ITO and the ITO wiring is laid under the seal part and extended to a terminal part. Japanese Unexamined Patent Application Publication No. Hei 10-206871 does not describe a range of applying the alignment film.

SUMMARY OF THE INVENTION

As to the reliability of the seal pert, attention has heretofore been paid only to the bonding force between the sealing material and the alignment film. However, when the increase in the bonding force between the sealing material and the alignment film is achieved, then bond between the alignment film and the underlying film thereof constitutes a problem. The alignment film and the underlying film have been considered in the art to have sufficient bond strength. As the frame becomes narrower, the bonding force between the alignment film and the underlying film thereof becomes a problem.

The underlying film of the alignment film differs between a TFT-substrate side and a counter-substrate side. In most cases, an organic film called an overcoat film constitutes the underlying film on the counter-substrate side while an inorganic film made of Sin or the like constitutes the underlying film on the TFT-substrate side. The alignment film is an organic film made of polyimide or the like. The bond strength between the organic film and the organic film is generally strong. However, the bond strength between the organic film and the inorganic film is comparatively weak. Therefore, the bonding force between the alignment film and the underlying film poses a problem to the TFT-substrate side.

It is an object of the present invention to increase the bond strength between the organic film and the inorganic film on the TFT-substrate side in particular and to provide a liquid crystal display device ensuring the reliability of the seal part while narrowing of the frame.

The present invention is directed to solution to the above problem and the specific means thereof are as follows.

According to a first aspect of the present invention, a liquid crystal display device includes: a TFT substrate which includes a display region and a terminal part, and has an inorganic insulating film formed on an organic passivation film and an alignment film formed over the inorganic insulating film; a counter substrate, the TFT substrate and the counter substrate bonded together by a sealing material formed at a seal part surrounding the display region; and a liquid crystal sealed inside, and has a structure where at the seal part, a transparent conductive oxide film is formed between the inorganic insulating film and the alignment film, an edge of the transparent conductive oxide film exists inside an edge of the TFT substrate.

According to a second aspect of the present invention, the liquid crystal display device according to the first aspect thereof has a structure where at the seal part, the organic passivation film is formed with a groove-like through-hole surrounding the display region, and the transparent conductive oxide film is formed inside than the groove-like through-hole.

According to a third aspect of the present invention, the liquid crystal display device according to the first aspect thereof has a structure where the transparent conductive oxide film is made of ITO.

According to a fourth aspect of the present invention, the liquid crystal display device according to the first aspect thereof has a structure where the transparent conductive oxide film is made of IZO.

According to a fifth aspect of the present invention, the liquid crystal display device according to the first aspect thereof has a structure where the transparent conductive oxide film is formed on four sides surrounding the display region.

According to a sixth aspect of the present invention, the liquid crystal display device according to the first aspect thereof has a structure where the transparent conductive oxide film is formed on the three sides except a terminal part.

According to a seventh aspect of the present invention, the liquid crystal display device according to the first aspect thereof has a structure where the transparent conductive oxide film is continuously formed around the display region, and the width of an overlap between the sealing material and the transparent conductive oxide film is 100 µm or more.

According to an eighth aspect of the present invention, the liquid crystal display device according to the first aspect thereof has a structure where the transparent conductive oxide film is formed in a plurality of continuous lines surrounding the display region, and the total of the widths of overlaps between the sealing material and the transparent conductive oxide film formed in the plural continuous lines is 100 µm or more.

According to a ninth aspect of the present invention, the liquid crystal display device according to the first aspect thereof has a structure where the area of an overlap between the transparent conductive oxide film and the sealing material is 20% or more of the total bond area on which the sealing material on the TFT-substrate side is bonded to the transparent conductive oxide film.

According to a tenth aspect of the present invention, the liquid crystal display device according to the first aspect thereof has a structure where the alignment film contains a silane coupling agent.

According to an eleventh aspect of the present invention, the liquid crystal display device according to the first aspect thereof has a structure where the alignment film is subjected to optical alignment processing.

According to the present invention, the liquid crystal display device ensuring the reliability of the seal part is provided because the bonding force between the alignment film and the underlying film thereof can be ensured even in the structure where the frame is narrowed and the alignment film is applied to the seal part.

DETAILED DESCRIPTION

Figure 20:
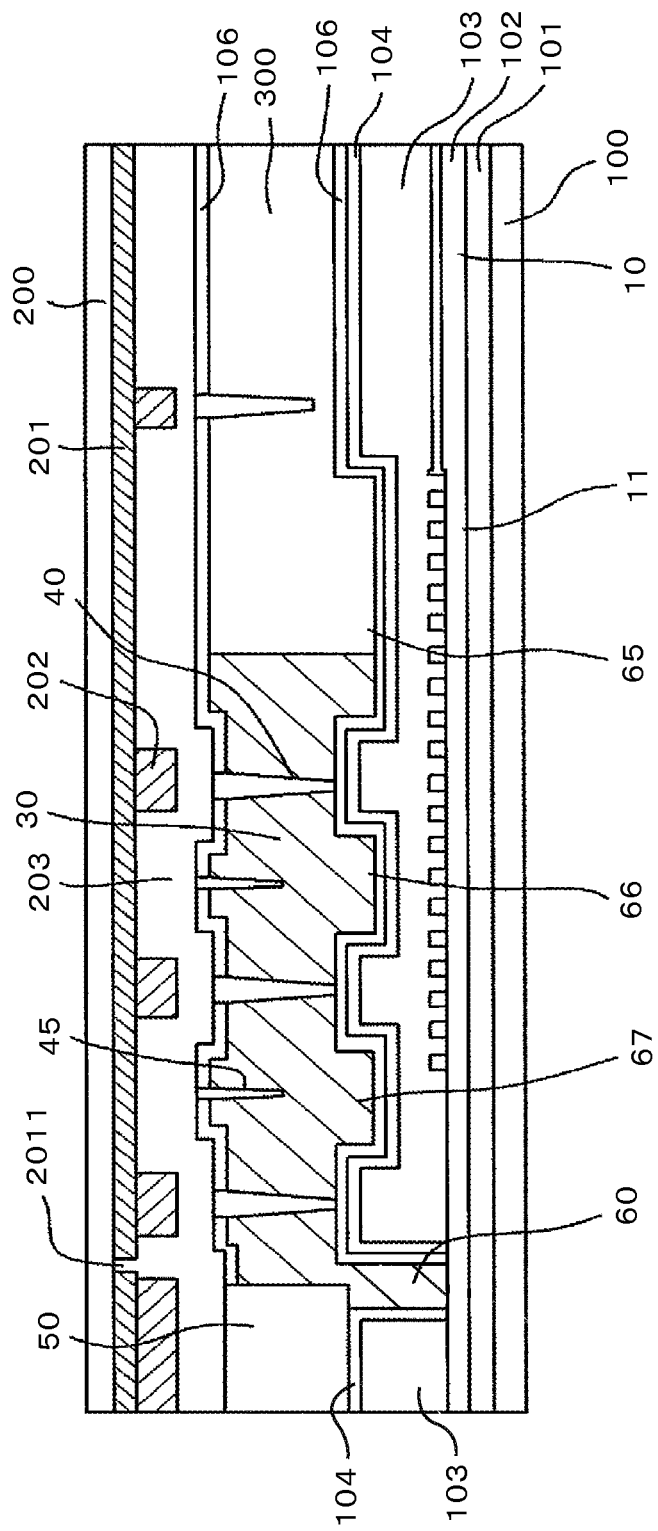
FIG. 20 is a sectional view taken on the line A-A in FIG. 1.

Before describing specific embodiments of the present invention, a brief description is made on a structure of a liquid crystal display device. FIG. 20 is a sectional view showing an example of a seal part of the liquid crystal display device. Referring to FIG. 20, liquid crystal 300 is sandwiched between a TFT substrate 100 and a counter substrate 200. An alignment film 106 is formed on each of the surfaces of the TFT substrate 100 and the counter substrate 200, on which surfaces the TFT substrate 100 and the counter substrate 200 make contact with the liquid crystal 300. At a narrow frame, the alignment film 106 is extended to a seal part, where the TFT substrate 100 and the counter substrate 200 are bonded together by a sealing material 30. The prior-art techniques have addressed the bond strength between the sealing material 30 and the alignment film 106. As the frame becomes narrower, however, bond strength between the alignment film 106 and an underlying film thereof is considered as a problem. On the TFT-substrate 100 side, in particular, the problem is the bonding force between the alignment film 106 and an inorganic insulating film 104 which is formed of SiN or the like as the underlying film of the alignment film.

On the other hand, a so-called viewing angle means much to the liquid crystal display. The IPS (In Plane Switching) system has excellent characteristics in the viewing angle. Alignment processing for the alignment film 106 includes a conventional rubbing method and a so-called optical alignment method which produces uniaxial anisotropy in the alignment film by irradiating the alignment film with polarized ultraviolet rays. In the IPS system, the optical alignment method is more suitable because the method negates the need for inducing liquid-crystal pretilt angle on the alignment film 106.

The alignment film 106 is irradiated with the ultraviolet rays in the optical alignment processing, which involves a fear that the ultraviolet rays may reach an interface between the alignment film 106 and the SiN film 104 as the underlying film thereof, inducing a decrease in the bonding force. Therefore, the problem of bonding force between the alignment film 106 and the underlying film 104 can be more critical in the IPS system.

The present invention to be described hereinbelow is directed to solution to the above problem. The contents of the present invention will be specifically described as below with reference to embodiments thereof.

First Embodiment

Figure 1:
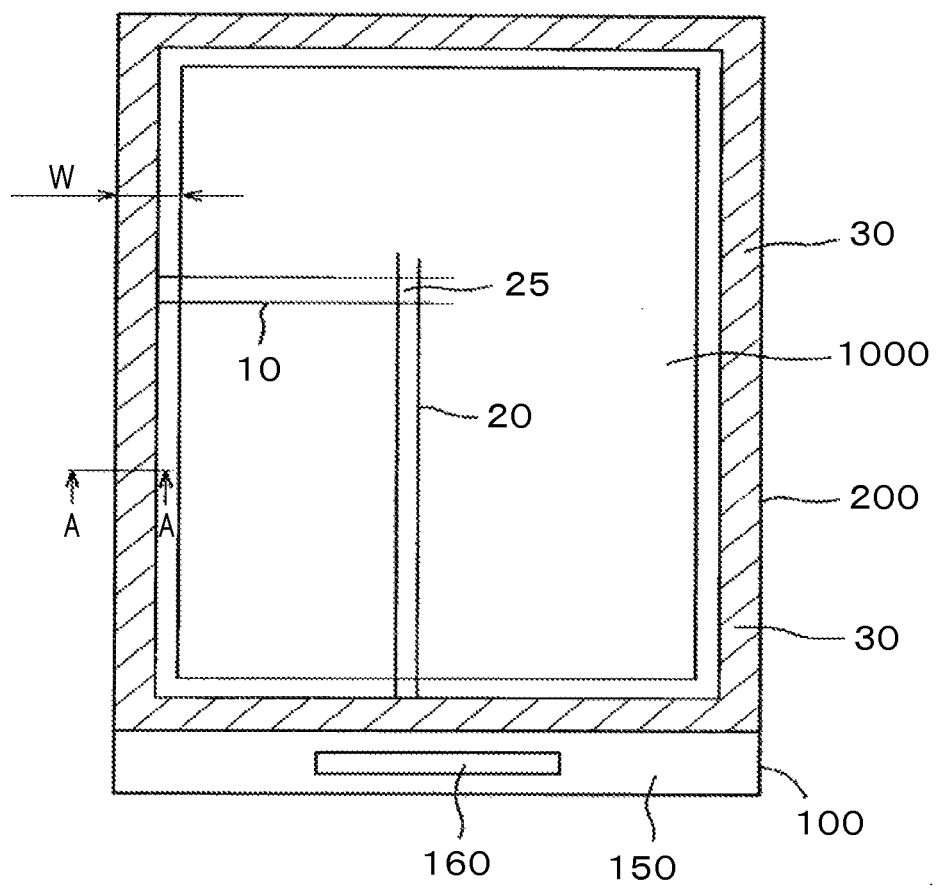
FIG. 1 is a plan view showing a liquid crystal display device according to the present invention.

FIG. 1 is a plan view showing a liquid crystal display device to which the present invention is applied. Referring to FIG. 1, the TFT substrate 100 and the counter substrate 200 are bonded together by the sealing material 30 while the liquid crystal is sandwiched between the TFT substrate 100 and the counter substrate 200. The TFT substrate 100 is formed in a larger size than the counter substrate 200. A portion of the TFT substrate 100 that extends as a single layer defines a terminal part 150. The terminal part 150 is formed with an IC driver 160 for driving a liquid crystal display panel, terminals for connection of a flexible wiring board for supplying electric power, image signals, scan signals and the like to the liquid crystal display panel, and the like.

Referring to FIG. 1, a display region 1000 includes scanning lines 10 extended horizontally and arranged vertically, and further includes image signal lines 20 extended vertically and arranged horizontally. An area enclosed by the scanning line 10 and the image signal line 20 defines a pixel 25. At the narrow frame, a distance w between an edge of the display region 1000 and an edge of the liquid crystal display device is reduced to the order of 1 mm. In this case, the device can allow for no more than 0.5 mm of bond width for the sealing material 30, which makes the bond strength at the seal part a crucial matter.

Figure 2:
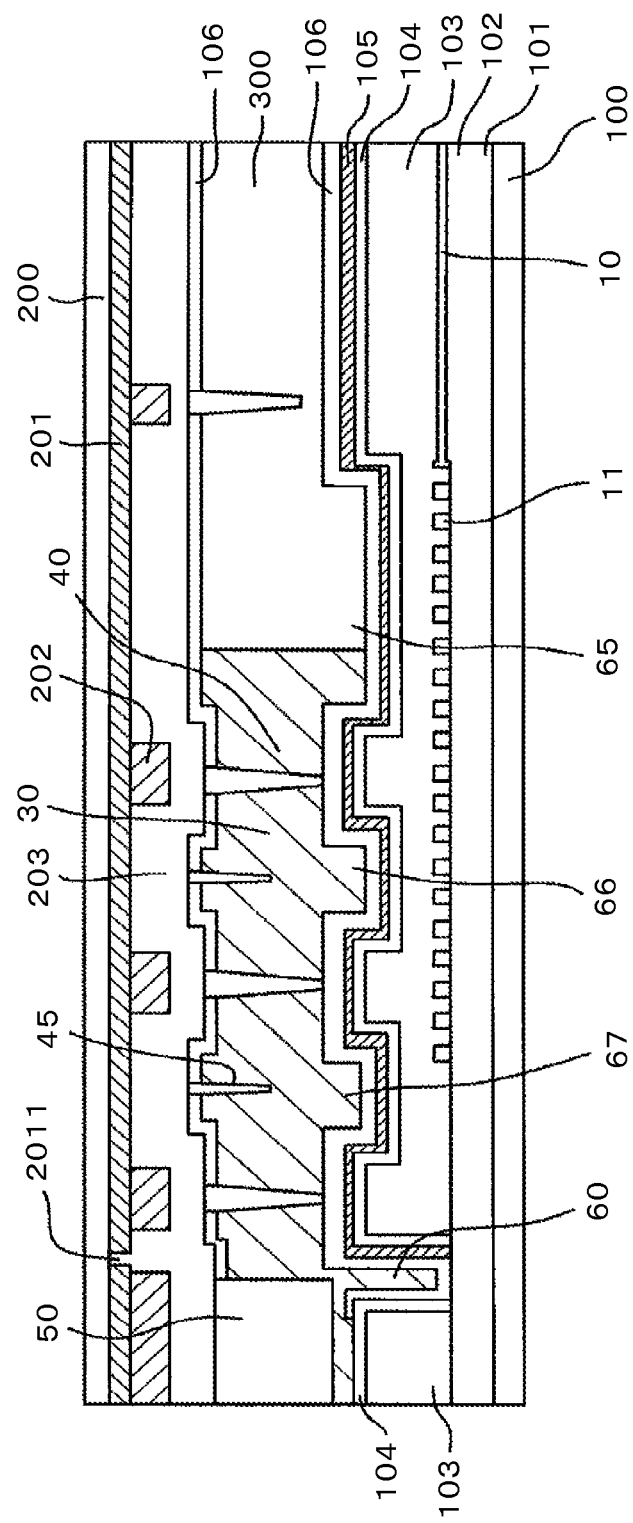
FIG. 2 is a sectional view taken on the line A-A in FIG. 1 for showing a first embodiment of the present invention.

FIG. 2 is a detailed sectional view of the seal part, corresponding to a cross section taken on the line A-A in FIG. 1. Referring to FIG. 2, a first insulating film 101 is formed on the TFT substrate 100 made of glass. The first insulating film 101 may sometimes be an undercoat film formed for preventing a semiconductor layer of the TFT from being contaminated with impurities from the glass. A second insulating film 102 is formed on the first insulating film 101. The second insulating film 102 may sometimes be a gate insulating film of the TFT. On the second insulating film 102, the scanning lines 10 and scanning-line lead lines 11 are formed. The rectangular scanning-line lead line 11 represents a cross section of the scanning-line lead line 11 extended from an upper side as seen in the drawing of FIG. 1.

An organic passivation film 103 is overlaid on the scanning lines 10 and the scanning-line lead lines 11. The passivation film 103 is formed thick or 2 to 3 μm in thickness and also serves as a flattening film. The passivation film 103 is formed of a photosensitive resin, negating the need for photoresist when patterned.

An interlayer insulating film 104 made of SiN is overlaid on the organic passivation film 103. In the display region of the IPS liquid crystal display device, this interlayer insulating film 104 is an insulating film between a lower layer electrode formed in a flat solid layer and an upper layer electrode including slits. The lower layer electrode may be a common electrode while the upper layer electrode may be a pixel electrode, and vice versa. Both the lower layer electrode and the upper layer electrode are formed of a transparent conductive oxide film 105 represented by ITO (Indium Tin Oxide). While the following description is made on the assumption that the transparent conductive oxide film 105 is made of ITO, the transparent conductive oxide film 105 may sometimes be made of IZO (Indium Zinc Oxide).

Referring to FIG. 2, the ITO 105 is formed on the interlayer insulating film 104, which constitutes a feature of the present invention. This ITO 105 is at least insulated from the ITO of the pixel electrodes in the display region 1000. However, the ITO 105 is formed in conjunction with the formation of the upper layer electrode in the display region.

The alignment film 106 is overlaid on the ITO 105. The bonding force between the alignment film 106 and the ITO 105 is so strong that the bond strength between the alignment film 106 and the ITO 105 can be ensured despite the narrow seal width. Although the bonding force between the alignment film 106 and the ITO 105 also means much to other parts, the bonding force particularly constitutes a crucial problem to the seal part, where stress occurs between the sealing material 30 and the alignment film with the ITO.

In a case where the alignment film 106 includes a silane coupling agent, the bonding force between the alignment film 106 and the ITO 105 can be further increased. This is because an OH-group of the alignment film 106 is strongly bonded to an OH-group of the ITO 105. Incidentally, the ITO 105 is also strongly bonded to the interlayer insulating film 104 as the underlying film thereof which is made of SiN. Since the ITO 105 does not extend so far as an edge of the TFT substrate 100, there is no fear of invasion of moisture through an interface between the ITO 105 and other layers in contact therewith.

The alignment film 106 is formed by applying an alignment film material as a starting liquid by flexography, ink-jet printing or the like. The organic passivation film 103 is formed with recesses 65, 66, 67 as a stopper for preventing the alignment material from spreading so far as an outside edge of the seal part. Further, a groove-like through-hole 60 formed on an even outer side of the recesses also serves as the stopper for the alignment film material. FIG. 2 shows the alignment film material spreading beyond the three recesses 65, 66, 67 and ending at the groove-like through-hole 60 as the final stopper.

Referring to FIG. 2, a black matrix 201 is formed on the counter-substrate 200 side. The black matrix 201 in FIG. 2 is disposed for preventing light leakage from the seal part 30. The black matrix 201 is formed of a resin and hence, the black matrix is formed with a black matrix groove 2011 for blocking moisture permeation through the resin. On the black matrix 201, a color filter 202 is formed in a strip pattern extended in a direction perpendicular to the drawing surface. The color filter 202 is formed in correspondence to a column-like spacer 40 formed on an overcoat film 203.

The overcoat film 203 is formed on the color filter 202. The overcoat film 203 is formed with protrusions at places corresponding to the color filter 202. This protrusion has a function to prevent the alignment film material being applied from spreading toward the outside of the substrate. A first column-like spacer 40 is formed at the protrusion of the overcoat film 203. The first column-like spacer 40 has a function to define a distance between the counter substrate 200 and the TFT substrate 100 at the seal part. Between the first column-like spacer 40 and the first column-like spacer 40, a second column-like spacer 45 which has a smaller height than the first column-like spacer 40 is formed. The second column-like spacer 45 has a function to prevent the distance between the TFT substrate 100 and the counter substrate 200 from being excessively reduced when an external pressure is applied to the counter substrate 200.

The alignment film 106 is overlaid on the overcoat film 203. A wall-like spacer 50 is formed at an end of the seal part. The wall-like spacer 50 is placed on a boundary between adjoining liquid crystal display panels on a mother substrate where a plurality of liquid crystal display panels are formed. Scribing is performed along the center of the wall-like spacer 50, followed by separating the individual liquid crystal display panels by breaking the mother substrate. The reason for locating the wall-like spacer at this portion is that the mother substrate cannot be broken despite the scribing performed on the spacer if the sealing material 30 exists at this portion. Referring to FIG. 2, the sealing material 30 is present in a slight gap between the wall-like spacer 50 and the TFT-substrate 100 side. However, this sealing material does not affect the breaking operation significantly so long as the thickness of the sealing material in this gap is 1 µm or less. In some cases, the sealing material 30 having a thickness of 1 µm or less may contribute to bonding between the counter substrate 200 and the TFT substrate 100.

Referring to FIG. 2, the alignment film 106 formed on the counter-substrate 200 side extends beyond the protrusions formed on the overcoat film 203 and ends at the wall-like spacer 50. On the counter-substrate 200 side, the alignment film 106 is formed on the overcoat film 203. Both the overcoat film 203 and the alignment film 106 are formed of organic materials. The bonding force between the organic materials is so strong that the bonding force between the alignment film 106 and the overcoat film 203 does not matter much.

At the seal part, the TFT substrate 100 and the counter substrate 200 are bonded together by the sealing material 30. Although the sealing material 30 is bonded to the alignment films 106 as seen in FIG. 2, the bond between the sealing material 30 and the alignment films 106 can be practically maintained. In FIG. 2, the liquid crystal 300 is filled in space inside the sealing material 30.

Figure 3:
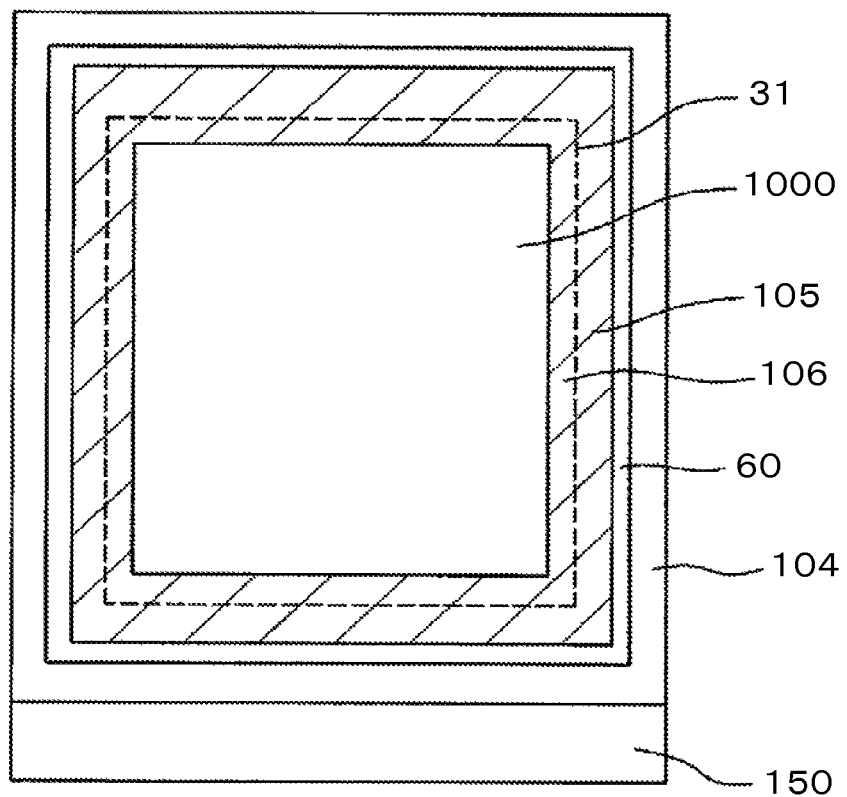
FIG. 3 is a schematic plan view of a TFT substrate corresponding to FIG. 2.

FIG. 3 is a plan view of the TFT substrate 100 shown in FIG. 1 and FIG. 2. FIG. 3 is a schematic diagram showing relationships among the seal part, the display region 1000, the interlayer insulating film 104, the groove-like through-hole 60 and the ITO 105. Referring to FIG. 3, an area outside a dotted line 31 defines the seal part where the sealing material is formed. Around the display region, the ITO 105 is formed and its outside is surrounded by the groove-like through-hole 60, external to which is the interlayer insulating film 104 covering the organic passivation film.

The alignment film 106 covers the display region 1000 and an area between the display region 1000 and the groove-like through-hole 60. At the seal part, the alignment film 106 is formed on the ITO 105. The bonding forces between the ITO 105 and the alignment film 106 and between the ITO 105 and the interlayer insulating film 104 made of SiN are strong enough. Therefore, the alignment film 106 at the seal part shown in FIG. 3 has high reliability in bonding. Further, the ITO 105 does not extend so far as the edge of the TFT substrate 100 and hence, there is no fear of moisture invading from the edge of the TFT substrate 100 through the interface of the ITO 105.

Figure 4:
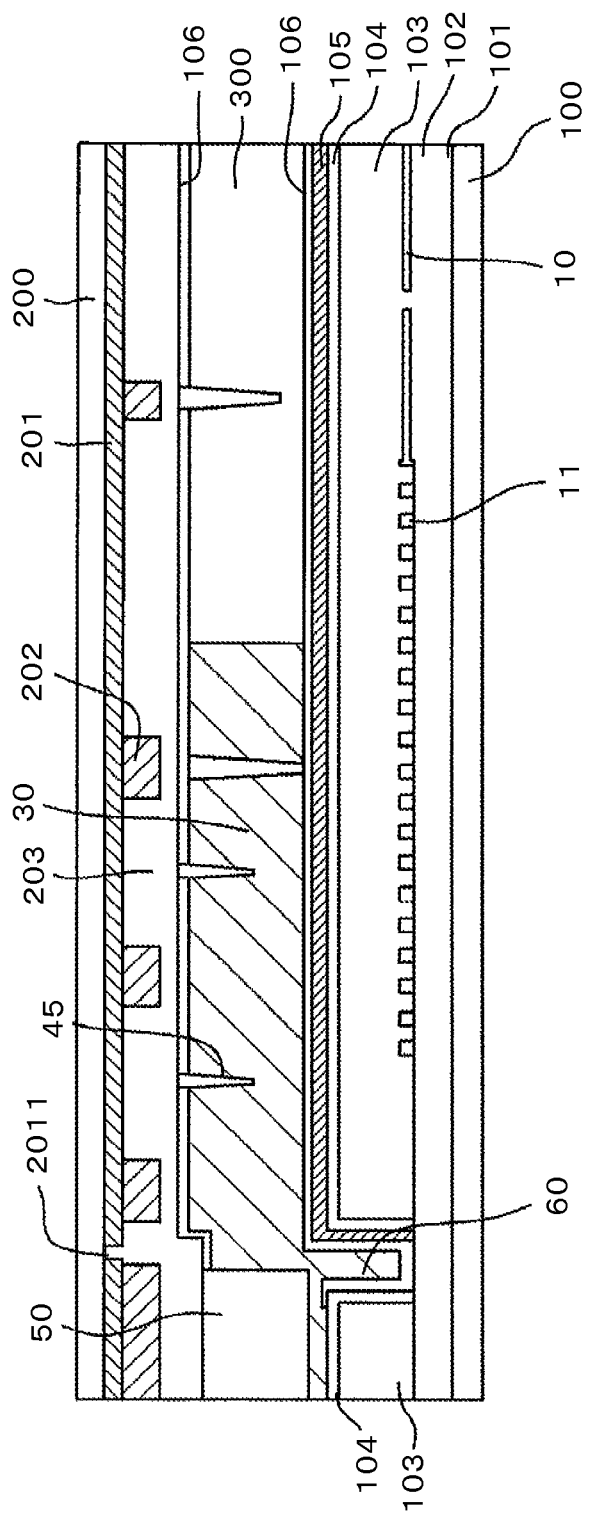
FIG. 4 is a sectional view taken on the line A-A in FIG. 1 for showing another mode of the first embodiment 1.

FIG. 4 is a sectional view showing another mode of this embodiment. FIG. 4 differs from FIG. 2 in that the organic passivation film 103 of the TFT substrate 100 is not formed with the recesses. As shown in FIG. 4, the alignment film 106 ends at the groove-like through-hole 60 of the organic passivation film 103. As seen in FIG. 4 as well, the ITO 105 is formed between the interlayer insulating film 104 and the alignment film 106 and hence, the bond performance of the alignment film 106 can be ensured. Further, the ITO 105 does not extend so far as the edge of the TFT substrate 100 and hence, there is no fear of moisture invading from the edge of the TFT substrate 100 through the interface of the ITO 105.

Figure 5:
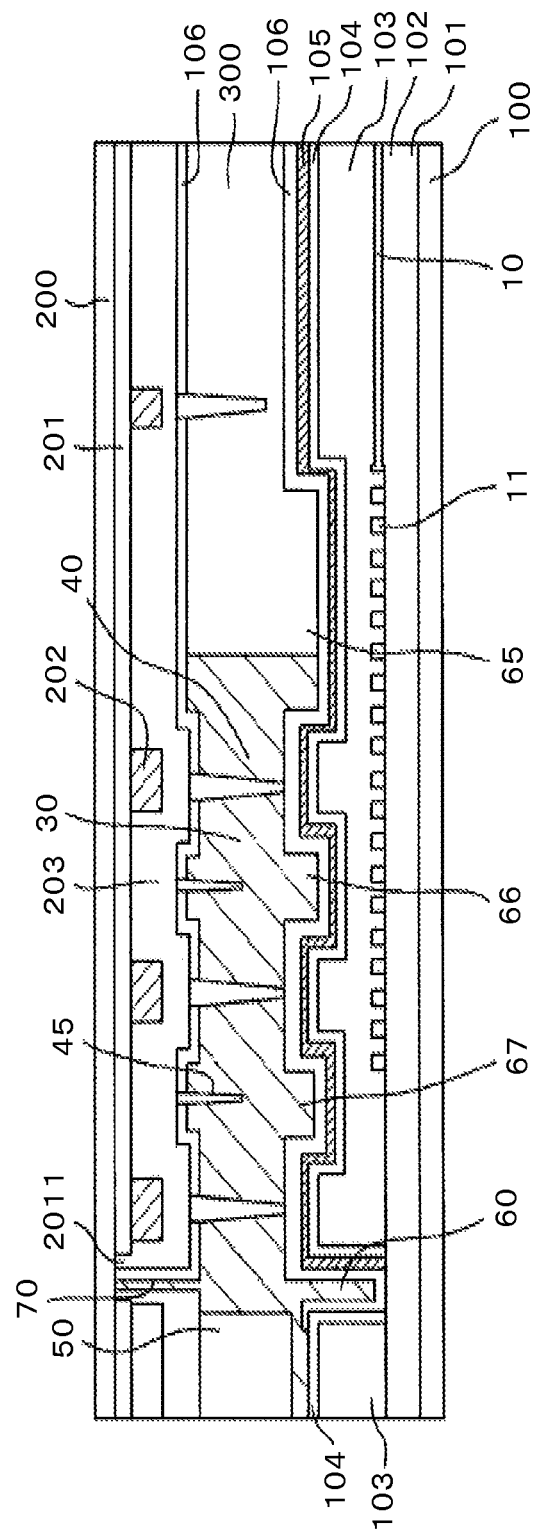
FIG. 5 is a sectional view taken on the line A-A in FIG. 1 for showing still another mode of the first embodiment 1.

FIG. 5 is a sectional view showing still another mode of this embodiment. FIG. 5 differs from FIG. 2 in that the overcoat film 203 on the counter-substrate 200 side is formed with a groove 70. This groove 70 is formed in a configuration to surround the display region 1000. The overcoat-film groove 70 has the same function as that of the groove-like through-hole 60 formed in the organic passivation film 103 on the TFT substrate 100. Namely, this groove blocks the external moisture invading through the overcoat film 203.

As seen in FIG. 5, the alignment film 106 ends at the overcoat-film groove 70. Further, the sealing material 30 is also filled in the overcoat-film groove 70. The other components are the same as those of the FIG. 2 and the effects thereof are also the same as those of FIG. 2.

Figure 6:
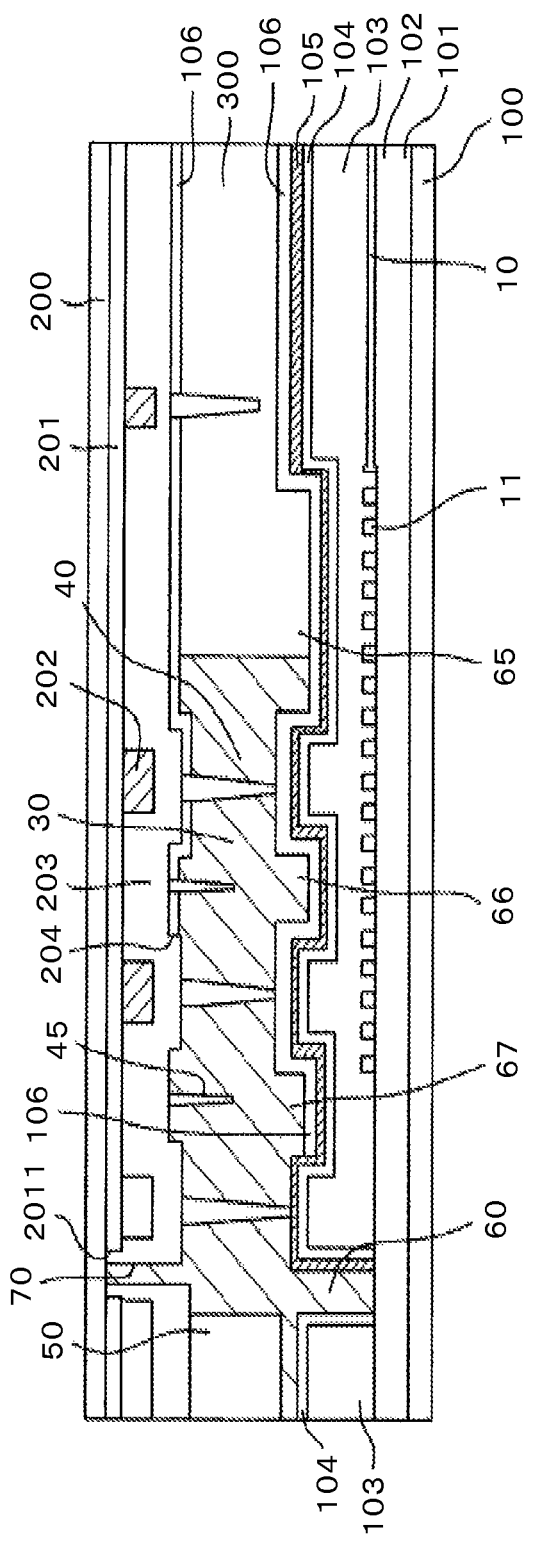
FIG. 6 is a sectional view taken on the line A-A in FIG. 1 for showing still another mode of the first embodiment 1.

FIG. 6 is a sectional view showing still another mode of this embodiment. FIG. 6 differs from FIG. 5 in that the alignment films 106 are not extended to the vicinity of the edge of the sealing material 30 but ends at some point short of the edge of the sealing material. In a case where the bond between the sealing material 30 and the alignment film 106 is somewhat weak, the mode shown in FIG. 6 is better adapted to increase the reliability of the seal part.

Referring to FIG. 6, the alignment film 106 on the TFT-substrate 100 side ends at the third recess 67 while the alignment film on the counter-substrate 200 side ends at the second protrusion from the display region. On the TFT-substrate 100 side, the sealing material 30 is bonded to the alignment film 106, the ITO 105, and the interlayer insulating film 104. On the counter-substrate 200 side, the sealing material 30 is bonded to the alignment film 106, and the overcoat film 203. The bond strength between the sealing material 30 and the ITO 105, the bond strength between the sealing material and the interlayer insulating film 104, and the bond strength between the sealing material 30 and the overcoat film 203 are greater than the bond strength between, the sealing material 30 and the alignment film 106.

As described above, this embodiment is adapted to prevent the separation of the alignment film 106 at the seal part on the TFT-substrate 100 side and hence, can increase the reliability of the seal part.

Second Embodiment

Figure 7:
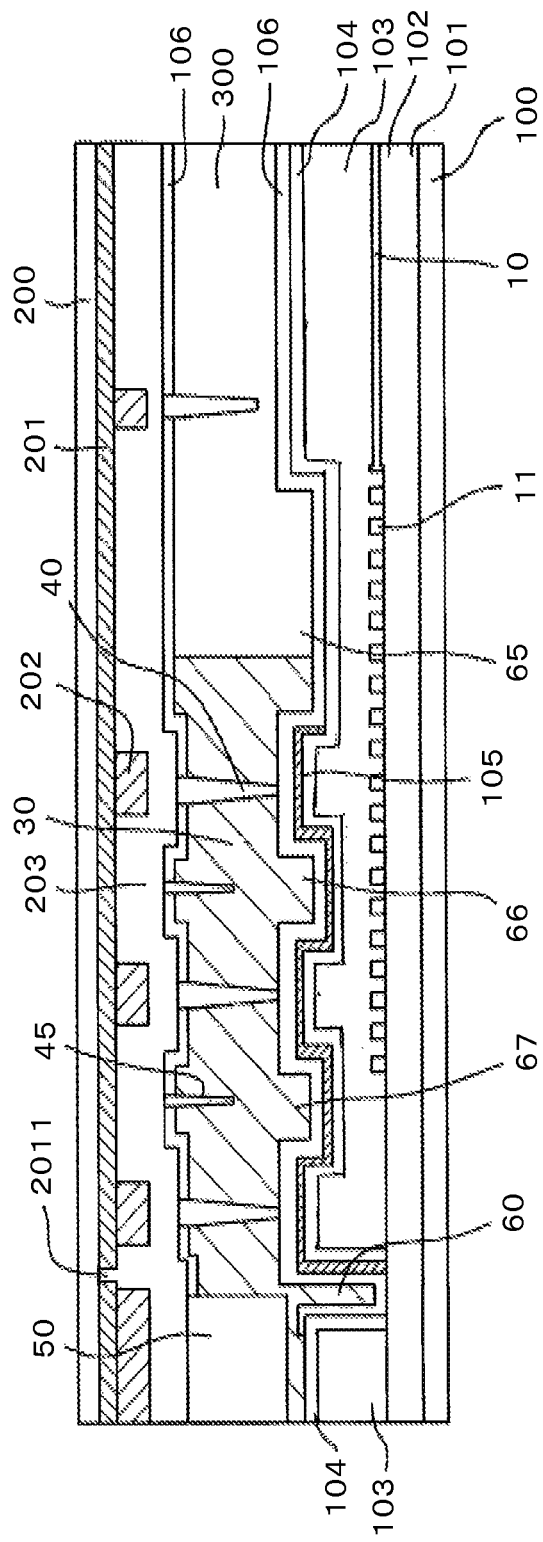
FIG. 7 is a sectional view taken on the line A-A in FIG. 1 for showing a second embodiment of the present invention.

FIG. 7 is a sectional view showing as second embodiment of the present invention. FIG. 7 is a sectional view also corresponding to the sectional view taken on the line A-A in FIG. 1. FIG. 7 differs from FIG. 2 of the first embodiment in that the ITO 105 formed on the TFT-substrate 100 side does not extend so far as an inside edge of the sealing material 30. In this case, as well, the ITO 105 exists between the alignment film 106 and the interlayer insulating film 104 at a main portion of the sealing material 30 and hence, the separation of the alignment film 106 at the seal part 30 can be prevented. The other components in FIG. 7 are the same as those of FIG. 2.

Figure 8:
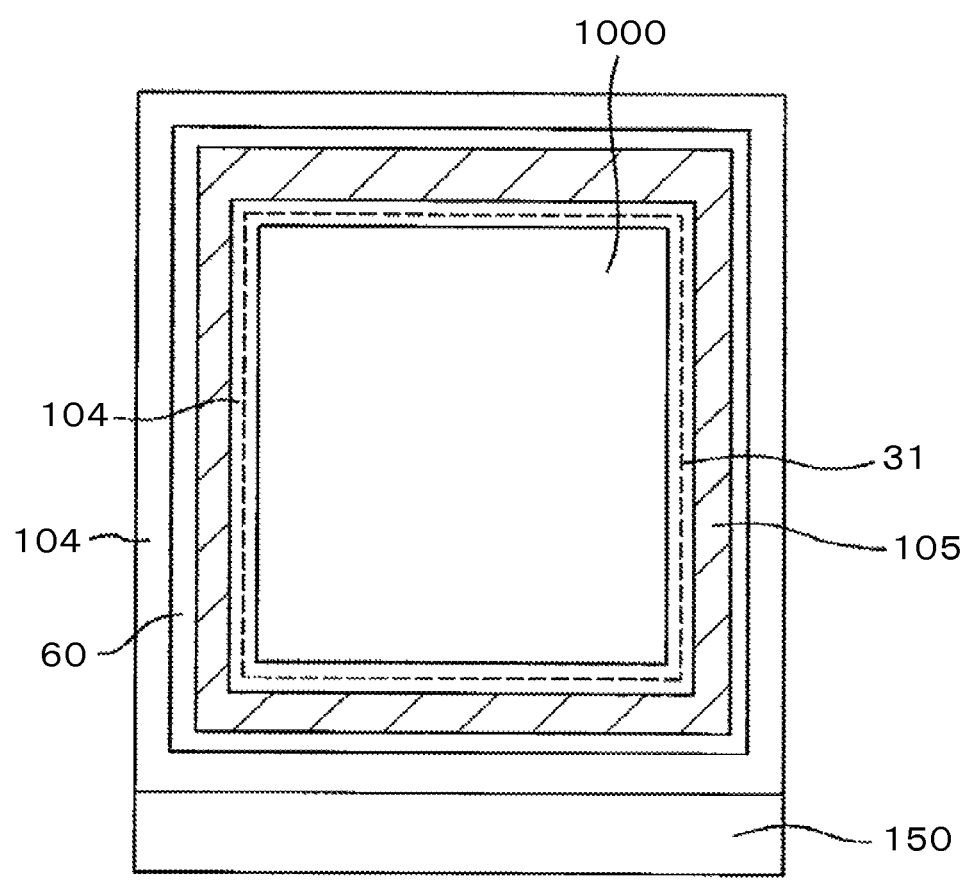
FIG. 8 is a schematic plan view of a TFT substrate corresponding to FIG. 7.

FIG. 8 is a plan view of the TFT substrate 100 corresponding to the structure of FIG. 7, or a schematic diagram showing relationships among the display region 1000, the range of the ITO 105, the interlayer insulating film 104, the groove-like through-hole 60 and the like. Referring to FIG. 8, an area outside the dotted line 31 defines the seal part where the sealing material 30 is formed. The ITO 105 extends within a range of the width of the sealing material 30 but not so far as the inside edge of the sealing material 30.

The range of applying the alignment film 106 is the whole area that is inside the groove-like through-hole 60 formed in the organic passivation film 103 and that includes the display region 1000. This embodiment is also adapted to prevent the separation of the alignment film because at a major part with respect of the seal width, the ITO 105 is disposed between the alignment film 106 and the interlayer insulating film 104. Similarly to the first embodiment, therefore, this embodiment is also adapted to increase the reliability of the seal part.

Figure 21:
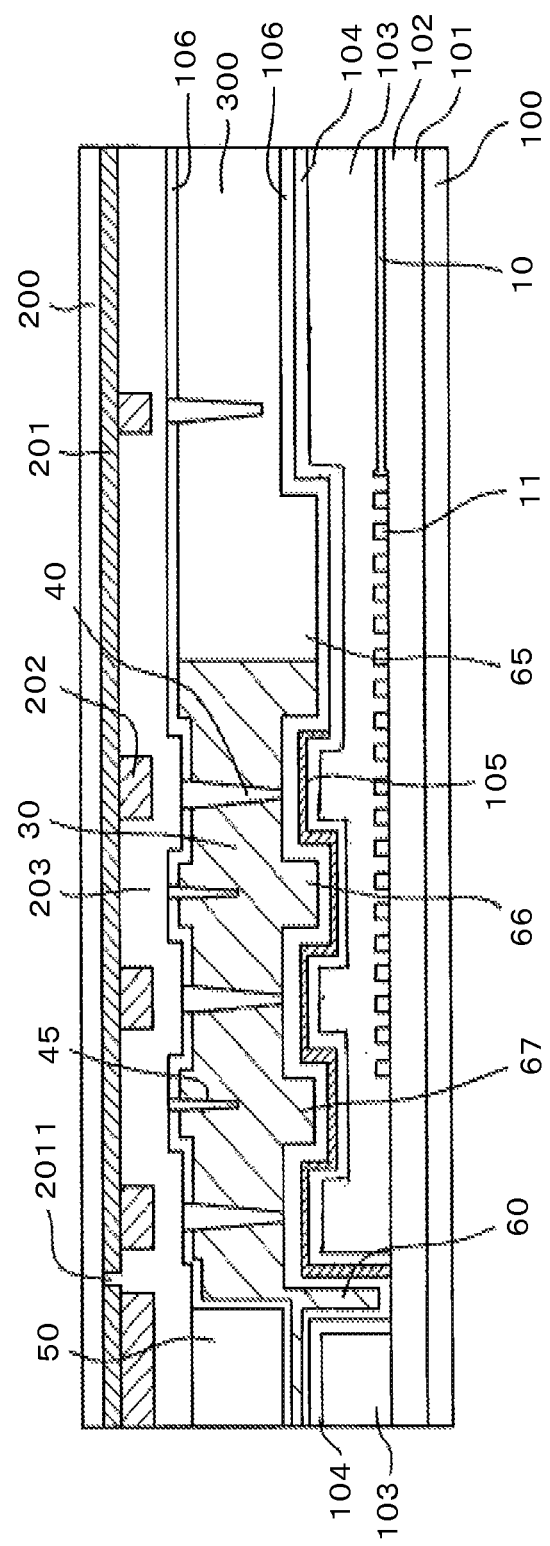
FIG. 21 is a sectional view taken on the line A-A in FIG. 1 according to another mode of the present invention.

FIG. 21 is another sectional view corresponding to the sectional view taken on the line A-A in FIG. 1. FIG. 21 differs from FIG. 7 in that the alignment film 106 is formed until the edge of the TFT substrate 100 and the counter substrate 200. In FIG. 21, the ITO 105 exists between the alignment film 106 and the interlayer insulating film 104 at a main portion of the sealing material 30 and hence, the separation of the alignment film 106 at the seal part 30 can be prevented, even the alignment film 106 is formed until the edge of the TFT substrate 100. Manufacturing becomes much easier if imitation of alignment film 106 is not necessary.

In FIG. 21, the alignment film 106 on the counter substrate 200 is formed until the edge of the counter substrate 200, however, the alignment film 106 on the counter substrate 200 can be stopped before it extends to the edge of the counter substrate 200 in a manner as depicted in FIGS. 2, 4-7.

In FIG. 21, ITO 105 doesn't extends so far as an inside edge of the sealing material 30, however, ITO 105 can extends beyond the inside edge of the sealing material 30 in a manner as depicted in FIG. 2, 4-6.

Third Embodiment

FIG. 9 to FIG. 19 each show an example of the range of forming the ITO 105 on the TFT substrate 100 according to the present invention. In each of the drawings, the alignment film 106 is formed on the whole area that is inside the groove-like through-hole 60 formed in the organic passivation film 103 and that includes the display region 1000. However, the alignment film 106 may also be formed on the whole area of the TFT substrate 100, the area including the seal part. Further, in the range of an overlap between the alignment film 106 and the sealing material 30, an outside edge of the alignment film 106 may sometimes be located inside the groove-like through-hole 60 of the organic passivation film 103. In all the examples, however, the ITO 105 is formed in the range that is inside the groove-like through-hole 60 formed in the organic passivation film 103. That is, the ITO 105 is formed inside the outside edge of the sealing material 30.

Figure 9:
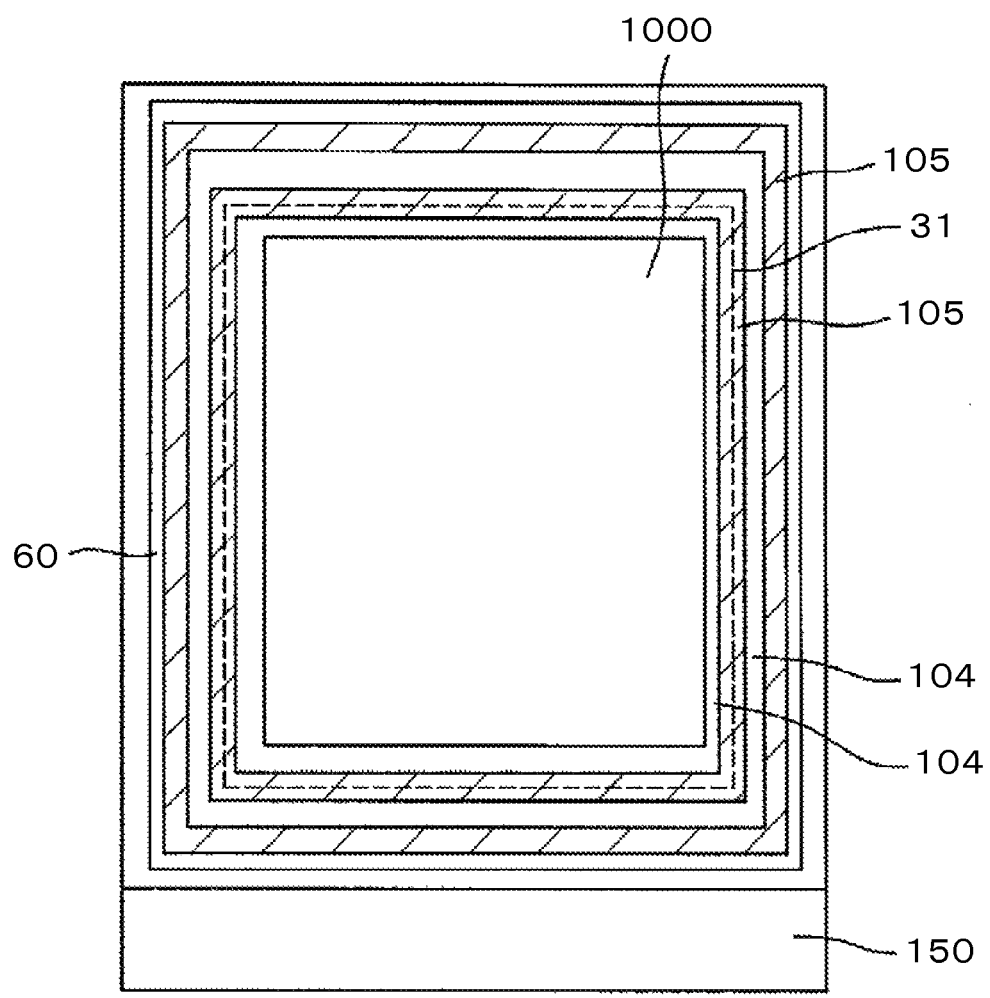
FIG. 9 is a schematic plan view of a TFT substrate for showing an ITO forming range.

FIG. 9 shows an example where the range of applying the ITO 105 is divided into two line portions and the inside edge 31 of the sealing material 30 is formed on the inner ITO 105. In this case, a part of the sealing material 30 is bonded to the interlayer insulating film 104 but the greater part of the sealing material 30 overlaps with the ITO 105. Therefore, the separation of the alignment film at the seal part can be prevented and the bond strength of the seal part can be ensured.

It is desirable that the range where the ITO 105 overlaps with the sealing material 30 is 100 μm or more in terms of width. In the case where the range of the overlap between the ITO 105 and the sealing material 30 is divided into two line portions as shown in FIG. 9, the total of the two line portions of the ITO 105 may be defined to be 100 μm or more. The same also applies to a case where the ITO includes three or more portions.

Figure 10:
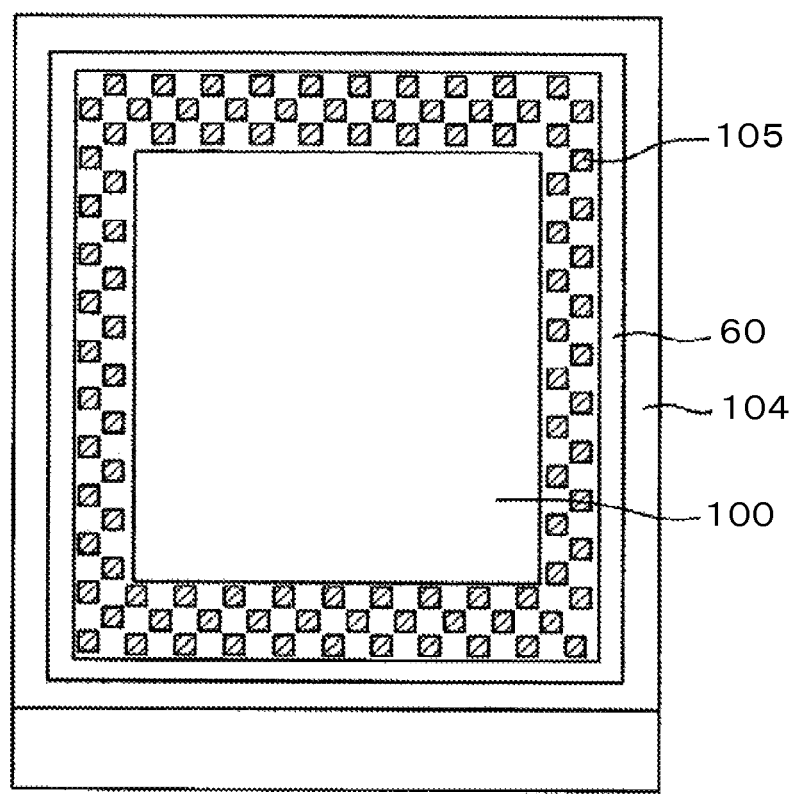
FIG. 10 is a schematic plan view of a TFT substrate according to another embodiment of the present invention for showing an ITO forming range.

FIG. 10 shows an example where the ITO 105 is formed in a plurality of islands rather than in a continuous configuration. Referring to FIG. 10, while the sealing material 30 may have the inside edge located at any place, the range of the overlap between the sealing material 30 and the ITO 105 may preferably be defined to be 20% or more of the bond area of the sealing material 30.

Figure 11:
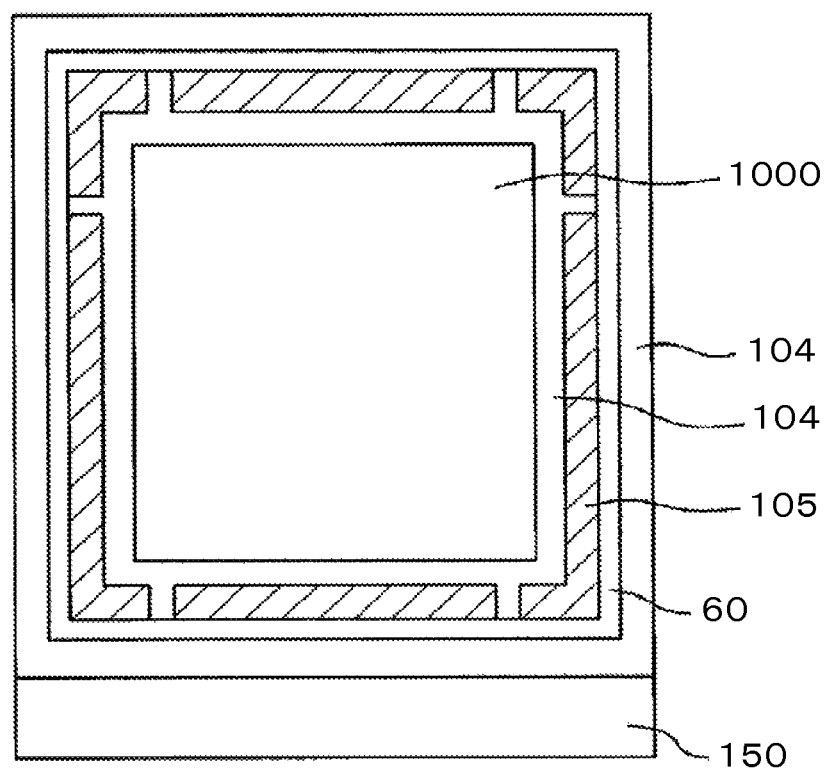
FIG. 11 is a schematic plan view of a TFT substrate according to still another embodiment of the present invention for showing an ITO forming range.

FIG. 11 shows an example where the ITO 105 is formed in a frame-like configuration, each side of which includes a gap extended toward the outside of the TFT substrate. The ITO may sometimes be laid out as shown in FIG. 11 due to wiring reasons or the like. In this case, as well, the area of the overlap between the ITO 105 and the sealing material 30 may be defined to be 20% or more of the bond area of the sealing material 30.

Figure 12:
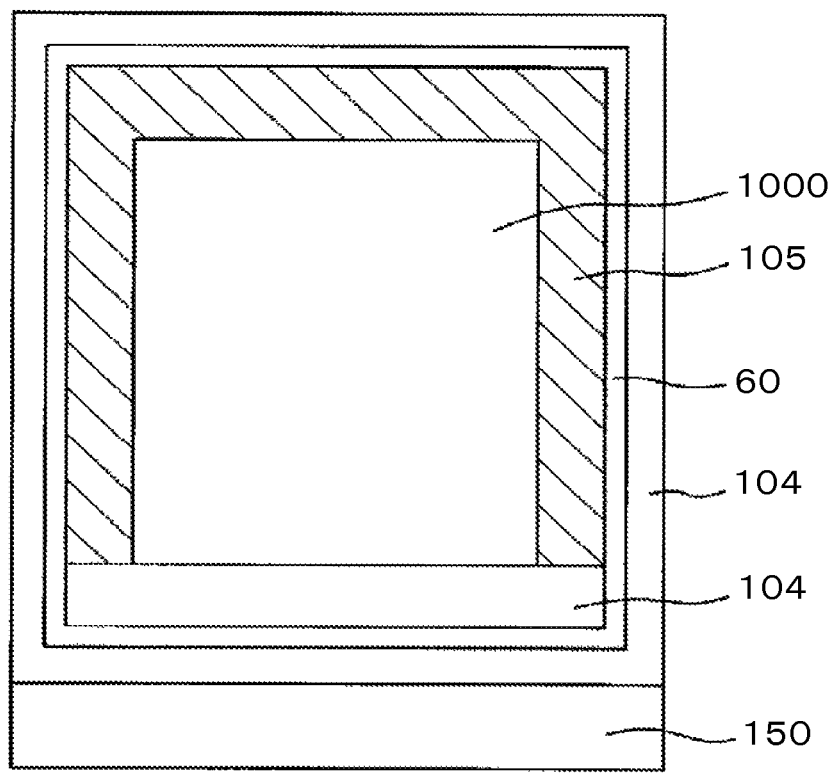
FIG. 12 is a schematic plan view of a TFT substrate according to still another embodiment of the present invention for showing an ITO forming range.
Figure 13:
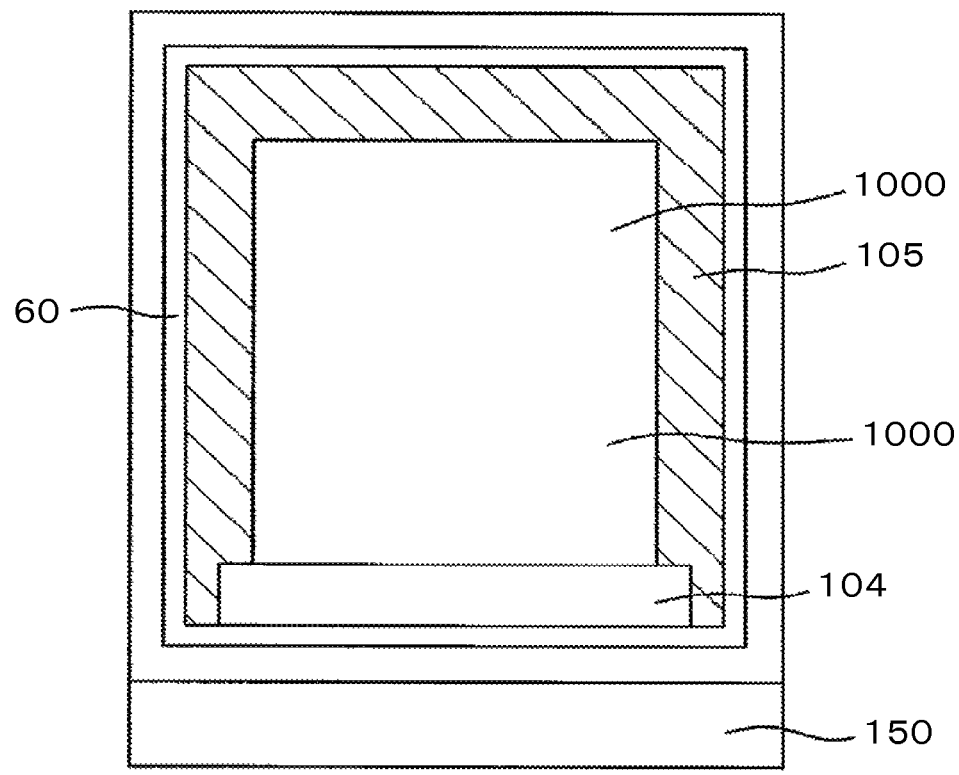
FIG. 13 is a schematic plan view of a TFT substrate according to still another embodiment of the present invention for showing an ITO forming range.
Figure 14:
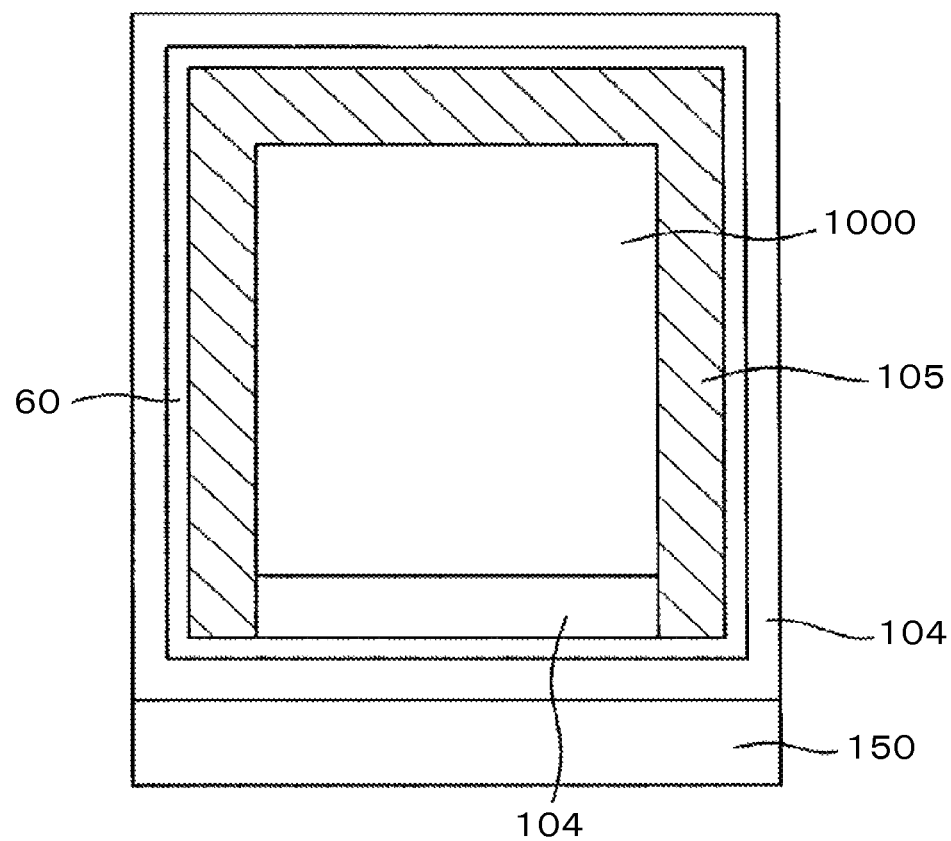
FIG. 14 is a schematic plan view of a TFT substrate according to still another embodiment of the present invention for showing an ITO forming range.

FIG. 12 shows an example where the ITO 105 has three sides configured the same way as in FIG. 3 except for one side abutting on the terminal part 150, or the ITO 105 is not formed on the side abutting on terminal part 150. The lead lines of the image signal lines 20, scanning lines 10 and the like are concentrated on the terminal-part 150 side, where it may sometimes be difficult to form the ITO 105 over the interlayer insulating film 104 due to layout reasons. On the other hand, the seal part on the terminal-part 150 side permits the frame to be formed wider than the seal parts on the other three sides. With the increased seal width and production tolerance taken into account, an overlap between the seal part and the alignment film can be omitted. In some cases, the seal part can ensure the bonding force if the ITO 105 is not provided on the terminal-part 150 side. FIG. 13 and FIG. 14 each show an exemplary modification of the range of removing the ITO 105 from the terminal-part 150 side. The modifications have the same effect as that described with reference to FIG. 12.

Figure 15:
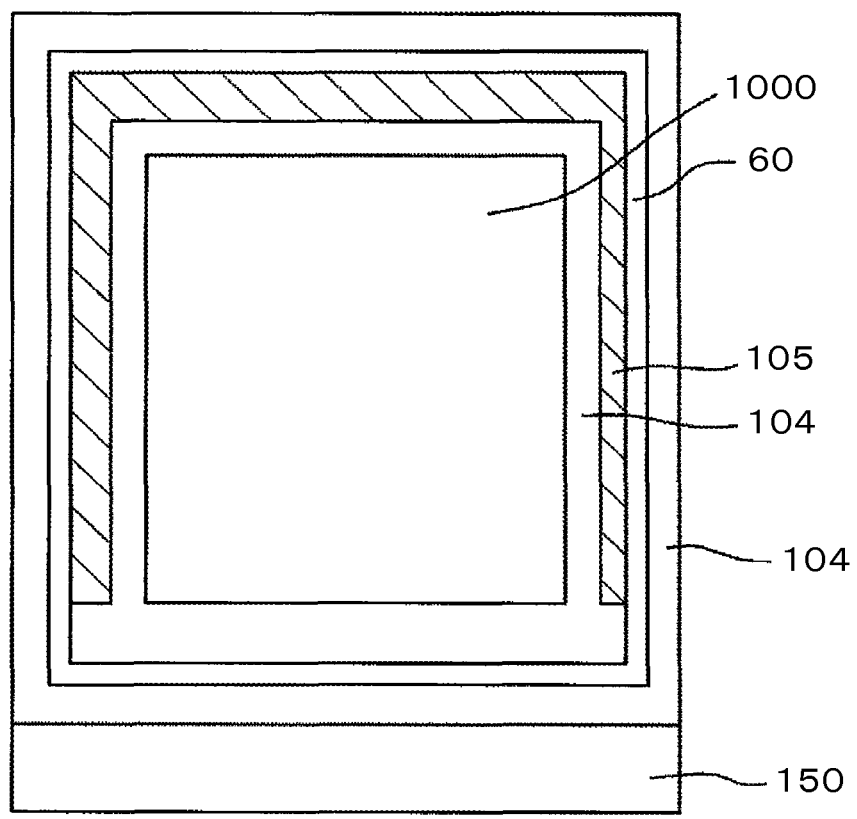
FIG. 15 is a schematic plan view of a TFT substrate according to still another embodiment of the present invention for showing an ITO forming range.
Figure 16:
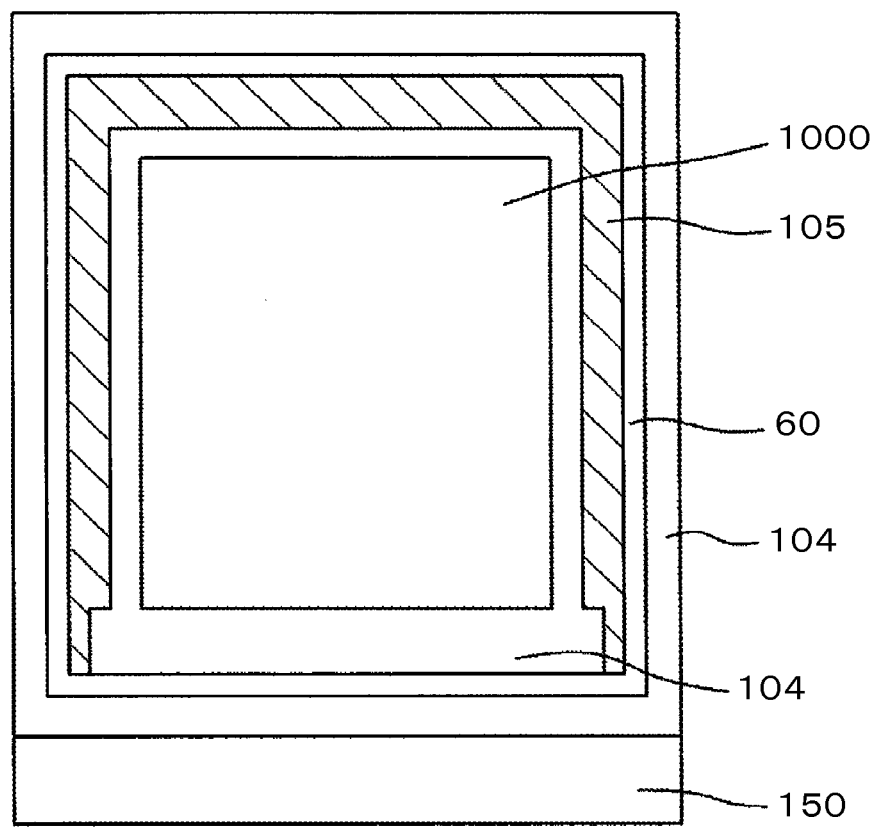
FIG. 16 is a schematic plan view of a TFT substrate according to still another embodiment of the present invention for showing an ITO forming range.
Figure 17:
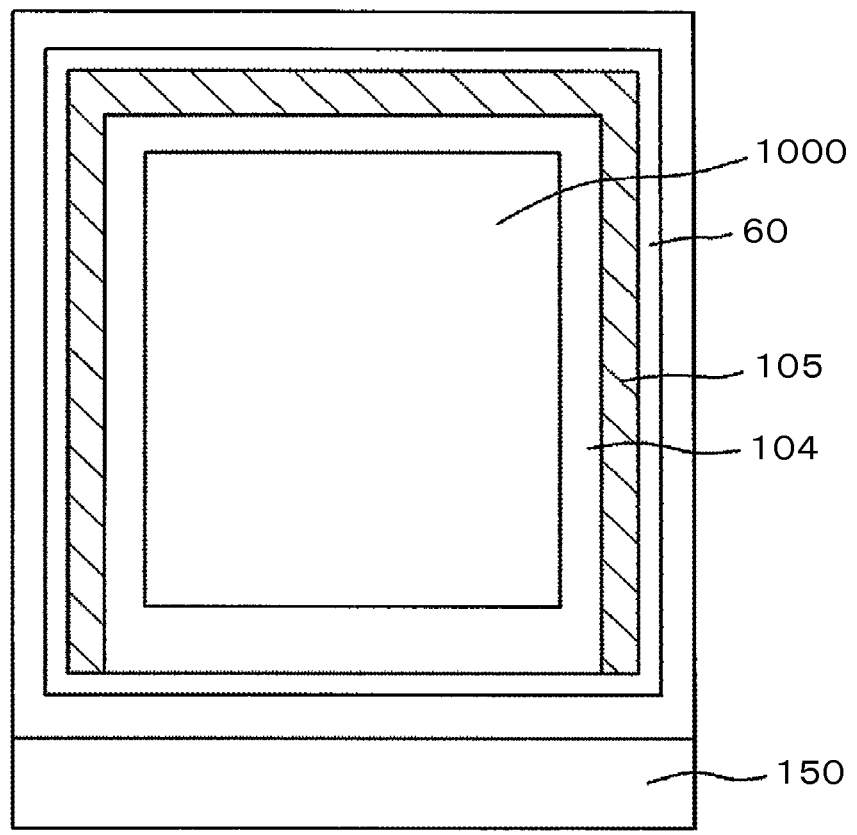
FIG. 17 is a schematic plan view of a TFT substrate according to still another embodiment of the present invention for showing an ITO forming range.

FIG. 15 shows an example where the ITO 105 has the three sides configured the same way as in FIG. 8 except for the one side abutting on the terminal part 150, or the ITO 105 is not formed on the side abutting on she terminal part 150. FIG. 16 and FIG. 17 each snow an exemplary modification of the range of removing the ITO 105 from the terminal-part 150 side. The modifications have the same effect as that described with reference to FIG. 12.

Figure 18:
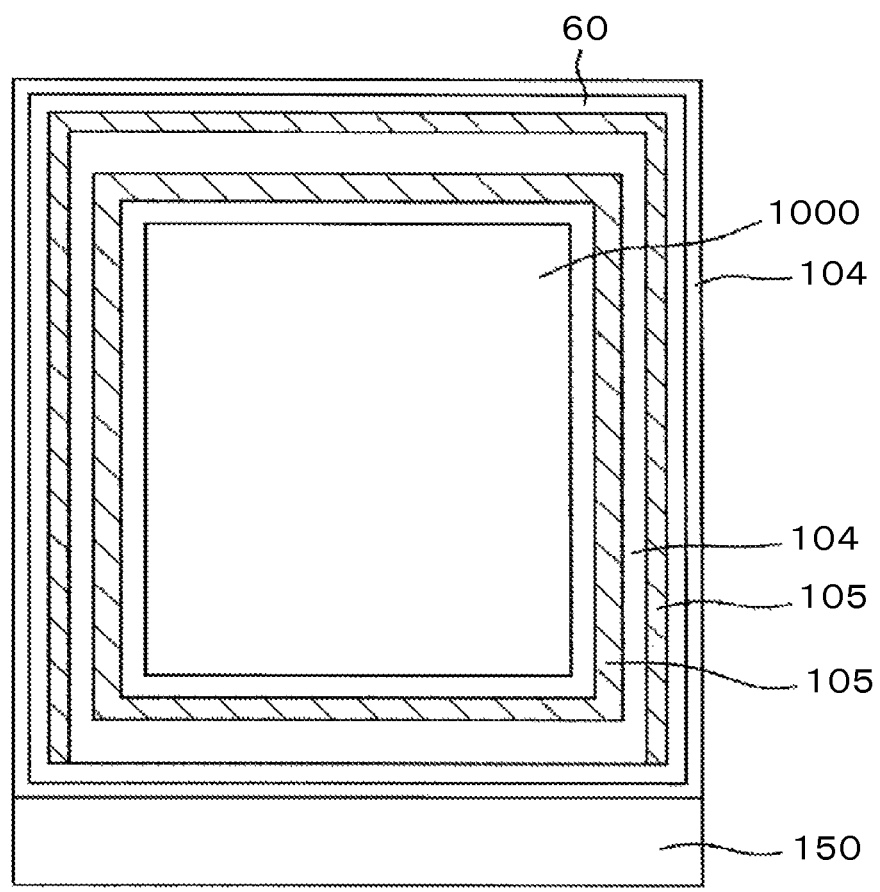
FIG. 18 is a schematic plan view of a TFT substrate according to still another embodiment of the present invention for showing an ITO forming range.
Figure 19:
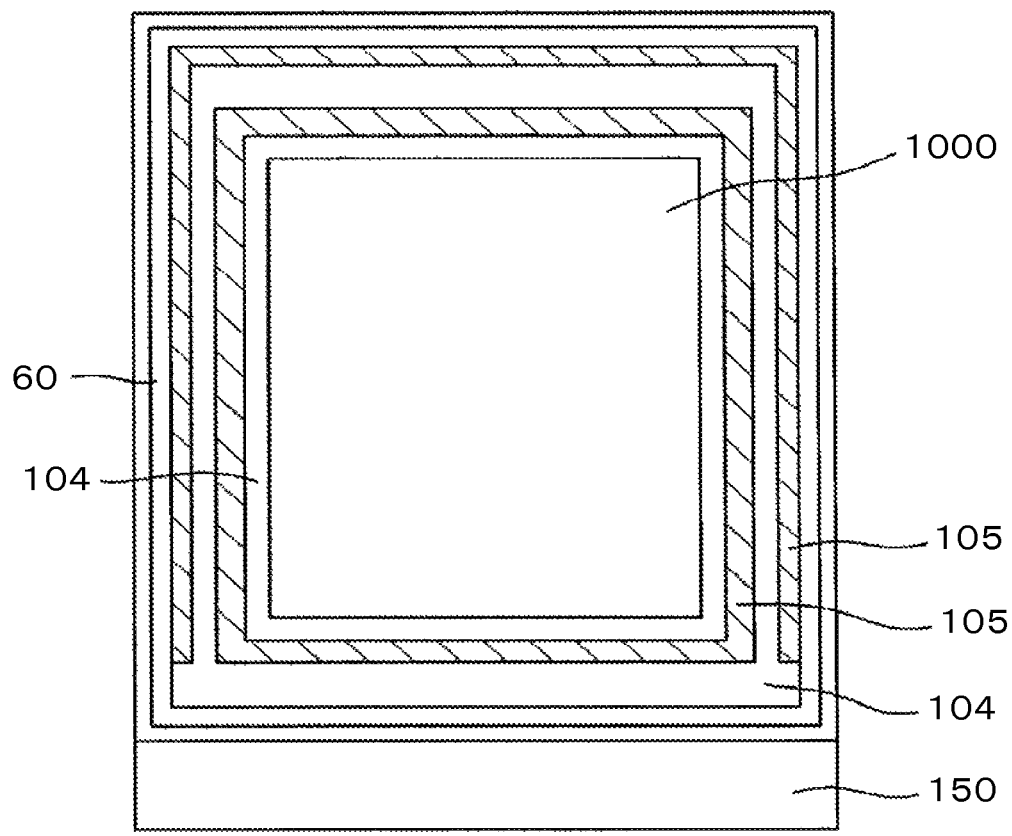
FIG. 19 is a schematic plan view of a TFT substrate according to still another embodiment of the present invention for showing an ITO forming range.

FIG. 18 shows an example where the ITO 105 is formed in two lines on the three sides around the display region 1000 except for the terminal-part 150 side, similarly to the layout shown in FIG. 9, and on the terminal-part 150 side, only the inner ITO line 105 is overlapped with the sealing material 30. In FIG. 18, the scanning lines 10 and the outer ITO line 105 are not extended in parallel with the terminal-part 150 side but extended to the edges of the interlayer insulating film 104. FIG. 19 shows an exemplary modification where only the inner ITO line 105 is overlapped with the sealing material 30 on the terminal-part 150 side while the outer ITO line 105 is not extended to the edges of the interlayer insulating film 104 on the terminal-part 150 side.

While the various examples of the ranges of forming the ITO 105 have been described above, what is common to the examples is that in the case of the ITO 105 formed around the display region 100, the width of the overlap between the ITO 105 and the sealing material 30 is 100 µm or more and that in the case of the ITO 105 not formed in the continuous configuration, the area of the overlaps between the ITO 105 and the sealing material 30 is 20% or more of the bond area of the sealing material 30. It is noted here that the term "the bond area of the sealing material 30" means the area on which the sealing material 30 on the TFT-substrate 100 side is bonded to the ITO. In the case where a plurality of annular ITOs 105 are formed and the plural ITOs 105 overlap with the sealing material 30, the common feature is that the total of the widths of overlaps between the plural ITOs 105 and the sealing material 30 is 100 µm or more.

According to the above description, the ITO 105 as the transparent conductive oxide film 105 is formed between the interlayer insulating film 104 and the alignment film 106. The ITO 105 can be formed in conjunction with the formation of the pixel electrodes or common electrodes made of ITO on the display region. In the case where the pixel electrodes or the common electrodes are made of IZO, however, the transparent conductive oxide film 105 formed between the interlayer insulating film 104 and the alignment film 106 may be made of IZO.

According to the present invention as described above, the separation of the alignment film at the seal part can be prevented and hence, the liquid crystal display device having the narrower frame can ensure the reliability of the seal part. When the optical alignment processing is performed on the alignment film of the IPS system, the bonding force between the alignment film and the underlying film thereof is decreased. Therefore, the present invention is particularly effective in the IPS system using the optical alignment.

What is claimed is:

1. A display device comprising:
    a first substrate has an inorganic film, a first organic film formed on the inorganic film and a second organic film formed over the first organic film,
    a second substrate opposed to the first substrate; wherein
    a transparent conductive film is formed between the first organic film and the second organic film at an edge of the first substrate, and
    an edge of the transparent conductive film exists inside the edge of the first substrate,
    the transparent conductive film is formed at three sides of the first substrate, except a side where a driver IC is set.
2. The display device according to claim 1, further comprising:
    a display area,
    a peripheral area arranged around the display area,
    wherein the transparent conductive film is arranged in the peripheral area.
3. The display device according to claim 2, wherein the transparent conductive film is made of ITO.
4. The display device according to claim 2, wherein the transparent conductive a oxide film is made of IZO.
5. The device according to claim 2, wherein the transparent conductive film is formed at four sides surrounding the display area.
6. The display device according to claim 2, wherein the first organic film has a groove which is formed to surround the display area, and the transparent conductive film is formed inside than the groove.
7. The display device according to claim 2, wherein the first organic film has a first portion and a second portion separated from the first portion,
    the transparent conductive film is formed in the first portion,
    the second portion is arranged at an outer side than the first portion on the first substrate,
    the second portion is not covered by the second organic film.
8. The display device according to claim 7, wherein the first portion and the second portion are separated by a groove which is formed in the first organic film.
9. The display device according to claim 7, wherein a plurality of wirings are arranged between the inorganic film and the first organic film in the first portion.

* * * * *